United States Patent
Tan

(10) Patent No.: US 7,553,546 B1
(45) Date of Patent: Jun. 30, 2009

(54) POLYETHYLENE OXIDE AND SILICONE COPOLYMERS AND THEIR USAGE ON MEDICAL DEVICES

(75) Inventor: Jiahong Tan, Canyon Country, CA (US)

(73) Assignee: Pacesetter, Inc., Sylmar, CA (US)

( * ) Notice: Subject to any disclaimer, the term of this patent is extended or adjusted under 35 U.S.C. 154(b) by 192 days.

(21) Appl. No.: 11/281,297

(22) Filed: Nov. 16, 2005

(51) Int. Cl.
*B32B 9/04* (2006.01)
*C08L 83/10* (2006.01)

(52) U.S. Cl. .................. 428/447; 428/450; 525/452; 525/453; 525/477; 528/25; 528/28

(58) Field of Classification Search .................. None
See application file for complete search history.

(56) References Cited

U.S. PATENT DOCUMENTS

| | | | | |
|---|---|---|---|---|
| 3,480,583 | A * | 11/1969 | O'Connor et al. | 556/446 |
| 4,276,394 | A | 6/1981 | Kennedy et al. | |
| 4,316,973 | A | 2/1982 | Kennedy | |
| 4,342,849 | A | 8/1982 | Kennedy | |
| 4,861,830 | A * | 8/1989 | Ward, Jr. | 525/92 A |
| 4,872,867 | A * | 10/1989 | Joh | 604/269 |
| 4,910,321 | A | 3/1990 | Kennedy et al. | |
| 5,240,971 | A * | 8/1993 | Eckberg et al. | 522/31 |
| 5,277,753 | A | 1/1994 | Kelley et al. | 156/643 |
| 5,358,516 | A | 10/1994 | Myers et al. | 607/116 |
| 5,629,133 | A * | 5/1997 | Wolf et al. | 430/269 |
| 5,686,499 | A * | 11/1997 | Fishback | 521/112 |
| 5,840,083 | A | 11/1998 | Braach-Maksvytis | |
| 5,843,149 | A | 12/1998 | Ebert et al. | 607/116 |
| 5,902,329 | A | 5/1999 | Hoffmann et al. | 607/121 |
| 6,046,143 | A * | 4/2000 | Khan et al. | 508/208 |
| 6,200,589 | B1 | 3/2001 | Kennedy et al. | |
| 6,310,169 | B1 * | 10/2001 | Kawabata et al. | 528/28 |
| 6,365,171 | B1 | 4/2002 | Kennedy et al. | |
| 6,521,736 | B2 | 2/2003 | Watterson et al. | |
| 6,555,619 | B1 | 4/2003 | Kennedy et al. | |
| 6,723,814 | B2 | 4/2004 | Meier et al. | |
| 6,936,298 | B2 | 8/2005 | Chaikof et al. | |
| 2002/0123087 | A1 * | 9/2002 | Vachon et al. | 435/14 |
| 2003/0028224 | A1 | 2/2003 | McVenes et al. | 607/36 |
| 2003/0204022 | A1 | 10/2003 | Kennedy et al. | |
| 2005/0004661 | A1 | 1/2005 | Lewis et al. | |
| 2005/0060015 | A1 | 3/2005 | Tanaka | 607/126 |

(Continued)

FOREIGN PATENT DOCUMENTS

EP 1 314 449 A2 5/2003

(Continued)

OTHER PUBLICATIONS

Freij-Larsson, Christina et al., "*Polyurethane surfaces modified by amphiphilic polymers: effects of protein adsorption*," Biomaterials 21:307-315 (2000).

(Continued)

*Primary Examiner*—Marc S Zimmer

(57) ABSTRACT

An implantable medical device includes a device body at least partially formed of a polymeric material including a base polymer and a block copolymer. The block copolymer includes at least one polyethylene oxide (PEO) segment and at least one silicone (SI) segment, wherein the weight average molecular weight of the block copolymer is in the range of about 400 to about 50,000.

12 Claims, 3 Drawing Sheets

U.S. PATENT DOCUMENTS

| | | | |
|---|---|---|---|
| 2005/0147647 A1 | | 7/2005 | Glauser et al. |
| 2005/0282997 A1 | | 12/2005 | Ward et al. |
| 2007/0226917 A1* | | 10/2007 | Kleen et al. ................... 8/406 |

FOREIGN PATENT DOCUMENTS

| | | | |
|---|---|---|---|
| EP | 1 314 449 A3 | | 5/2003 |
| WO | 0202674 A1 | | 1/2002 |
| WO | 2004044012 A1 | | 5/2004 |
| WO | WO 2004/052324 | * | 6/2004 |
| WO | WO 2005102253 A1 | * | 11/2005 |

OTHER PUBLICATIONS

Lee, Jin Ho et al., "*Platelet adhesion onto segmented polyurethane film surfaces modified by addition and crosslinking of PEO-containing block copolymers,*" Biomaterials 21:683-691 (2000).

Park, JaeHung et al., "*Hydrogels based on poly(ethylene oxide) and poly(tetramethylene oxide) or poly(dimethyl siloxane): synthesis, characterization, in vitro protein adsorption and platelet adhesion,*" Biomaterials 23:1797-1808 (2002).

Tan, Jiahong et al., "*Surface modification of polyurethanes using PEO-containing copolymers as additives: reduced fibrinogen adsorption correlates with reduced platelet adhesion,*" Society for Biomaterials 29$^{th}$ Annual Meeting Transactions, p. 470 (2003).

Tan, Jiahong, "*Polyethylene oxide-containing block copolymers as surface modification additives in polyurethanes for protein and cell resistance,*" Abstract of a Thesis, McMaster University (2004).

Erdodi, Gabor et al., "Novel Amphiphilic Conetworks Composed of Poly(Ethylene Glycol) and Polyisobutylene Chain Segments," Polym. Mater. Sci. Eng. 1998; 79:481-482.

Groenewolt, Mattijs., et al., "Polyisobutylene-block-Poly(ethylene oxide) for Robust Templating of Highly Ordered Mesoporous Materials," Adv. Mater. 2005; 17:1158-1162.

Jialanella, Gary L. et al., "Synthesis of Polystyrene-Block-Polyoxyethylene for Use as a Stabilizer in the Emulsion Polymerization of Styrene," J. Polym. Sci., A-Polym. Chem., 1992; 30:1925-1933.

Martinez-Castro, N., "New Block Copolymers of Isobutylene by Combination and Anionic Polymerizations," dissertation abstract, obtainable at http://opus.ub.uni-bayreuth.de/volltexte/2005/134/, dated Mar. 9, 2005.

Puskas, Judit E. et al., "Polyisobutylene-Based Biomaterials," J. Polym. Sci., A-Polym. Chem., 2004; 42:3091-3109.

Richard, R.E., et al., "Novel Polyisobutylene-based Block Copolymer Technology For the Controlled Release of Paclitaxel From Coronary Stents," Society for Biomaterials, 30th Annual Meeting Transactions, pp. 18-19. 2005.

Rooney, J.M., "Synthesis of a Block Copolymer Containing Polyisobutylene and Polyethylene Oxide Segments," J. Polym. Sci., Polym. Chem Ed. 1981; 19:2119-2122.

Wondraczek, R.H., and Kennedy, J.P. "New Telechelic Polymers and Sequential Copolymers by Polyfunctional Initiator-Transfer Agents (Inifers). 11. Synthesis, Extension and Crosslinking of Oxycarbonyl Isocyanate Telechelic Polyisobutylenes," Polymer Bulletin 1981; 4:445-450.

Vairon, J.P. et al., "Amphiphilic, Bi, Tri, and Star Block Copolymers of Styrene and Acrylic Acid Prepared Via Controlled Radical Polymerization and Their Use as Surfactants in Emulsion Polymerization," Universite Pierre & Marie Curie, UNESCO-SA-2001, presentation slides 1-6.

\* cited by examiner

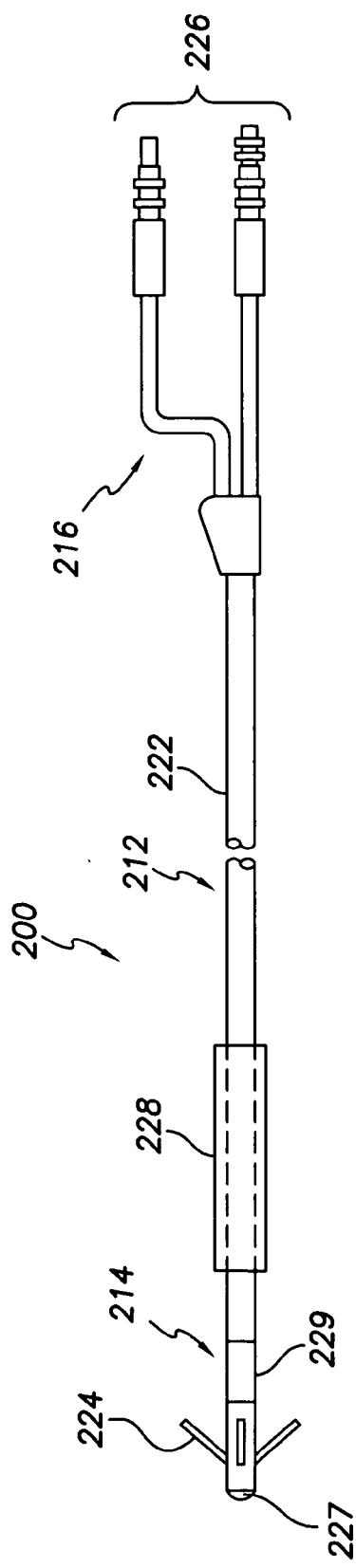
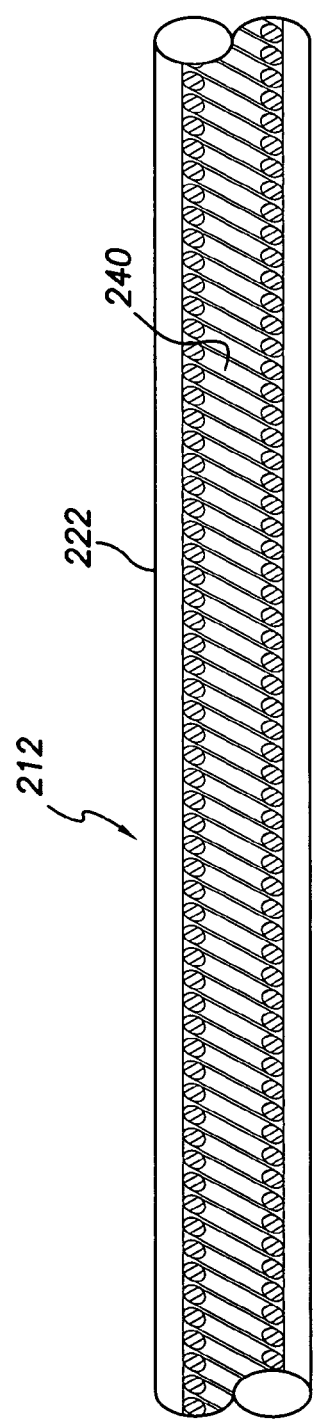
FIG. 2A
FIG. 2B

POLYETHYLENE OXIDE AND SILICONE COPOLYMERS AND THEIR USAGE ON MEDICAL DEVICES

CROSS-REFERENCE TO RELATED APPLICATIONS

This application is related to copending U.S. patent application Ser. No. 11/281,778, filed concurrently herewith, entitled "Methods of Preparing Implantable Medical Devices Having Lubricious Surfaces", which is incorporated herein by reference in its entirety.

FIELD OF THE INVENTION

The present invention relates generally to biocompatible and lubricious coatings, and more particularly, to polyethylene oxide and silicone copolymers and their usage.

BACKGROUND OF THE INVENTION

Many methods and materials have been explored to achieve biocompatibility of implantable medical devices (IMD). Implantable medical devices, as used herein, include any blood-contacting medical device that is implanted in the body, chronically or otherwise, including, but not limited to, blood-contacting surgical tools, implantable cardiac devices, implantable monitors, biological sensors, implantable drug delivery devices, catheters, artificial blood vessels and stents. For IMDs, it is especially desirable that there be minimal friction during implant to facilitate implant dynamics. To this end, IMDs have been coated with materials which increase wet lubricity, thereby reducing procedure time, insertion forces and patient discomfort. Lubricity also reduces tissue irritation and damage and provides greater control and maneuverability of the device during implant. Wet lubricity for hydrophobic surfaces may be achieved using hydrophilic coatings. Such coatings also improve biocompatibility by, for example, reducing protein adsorption and platelet adhesion and other blood interactions, as well as resisting bacterial adhesion.

For example, lead insulation materials have been surface-coated with a UV-cured polyvinylpyrrolidone (PVP) from SurModics, Inc. of East Prairie, Minn., using PHOTOLINK® chemistry coating technique to achieve the benefits of wet lubricity and hydrophilic coatings. This coating technique involves photochemical covalent bonding of the coating molecules to the insulation material substrate and requires several steps, including lead cleaning, PVP solution preparation, plasma treatment, lead coating, photo activation and cleaning. This process is complex and difficult to control and can lead to poor quality coatings.

Lubricious surfaces can also be prepared by chemical grafting techniques using other hydrophilic materials, such as polyethylene oxide (PEO), referred to also as polyethylene glycol (PEG), which can be grafted to the polymer substrate either as end segments or branches to the back bone of the polymer. The existing techniques and materials, however, do not provide effective lubricious surfaces on medical devices formed of materials including silicone rubber or silicone polyurethane copolymer (SPC). Silicone rubber and SPC are common insulation materials used on medical leads.

What are needed, therefore, are new materials to achieve highly lubricious coatings for implantable medical devices, which are particularly useful for preparing lubricious coatings on silicone and SPC leads or other silicone rubber or SPC medical devices. The present invention provides PEO and silicone copolymers to satisfy these and other needs, and provides further related advantages, as will be made apparent by the description of the embodiments that follow.

BRIEF SUMMARY OF THE INVENTION

Block copolymers presented herein include at least one polyethylene oxide (PEO) segment and at least one silicone (SI) segment. In one embodiment, the weight average molecular weight of the block copolymer is in the range of about 400 to about 50,000.

Also presented is an implantable medical device which includes a device body at least partially formed of a polymeric material including a base polymer and the block copolymer. The weight average molecular weight of the block copolymer is in the range of about 400 to about 50,000.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. In the drawings, like reference numbers indicate identical or functionally similar elements.

FIG. 2A shows an implantable medical lead in accordance with an embodiment.

FIG. 2B is an axial cross section of a portion of the lead of FIG. 2A having a lead insulation tubing formed of a blended polymeric material in accordance with another embodiment.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the present invention. Therefore, the following detailed description is not meant to limit the invention. Rather, the scope of the invention is defined by the appended claims. Thus, the operation and behavior of the present invention will be described with the understanding that modifications and variations of the embodiments are possible, given the level of detail presented herein.

Surface modification amphiphilic copolymers (SMAC) contain one or more hydrophilic segments and one or more hydrophobic segments. Since hydrophilic segments of an SMAC can provide wet lubricity to a surface, SMACs can be used as to prepare lubricious coatings on medical device bodies formed of hydrophobic base materials. Such hydrophilic segments may include, for example, polyethylene oxide (PEO) (also known as polyethylene glycol (PEG)), poly(vinyl alcohol) (PVA), polyacrylamides (PA), polyvinylpyrrolidone (PVP), and poly(hydroxyethyl methacrylate) (PHEMA). In addition, hydrophobic segments of an SMAC coating interact with a hydrophobic base material to help anchor the SMAC coating to the surface of the medical device. Such hydrophobic segments may include, for example, polypropylene oxide (PPO), polyurethane (PU), polystyrene (PS), polypropylene (PP), polytetrafluoroethylene (PTFE), polytetramethylene oxide (PTMO), and polyalkyl siloxane (PAS). Polyalkyl siloxane includes poly(dialkyl siloxane) such as poly(dimethyl or diethyl siloxane). A polyalkyl siloxane segment is simply referred to herein as a silicone (SI) segment.

Figure 1:
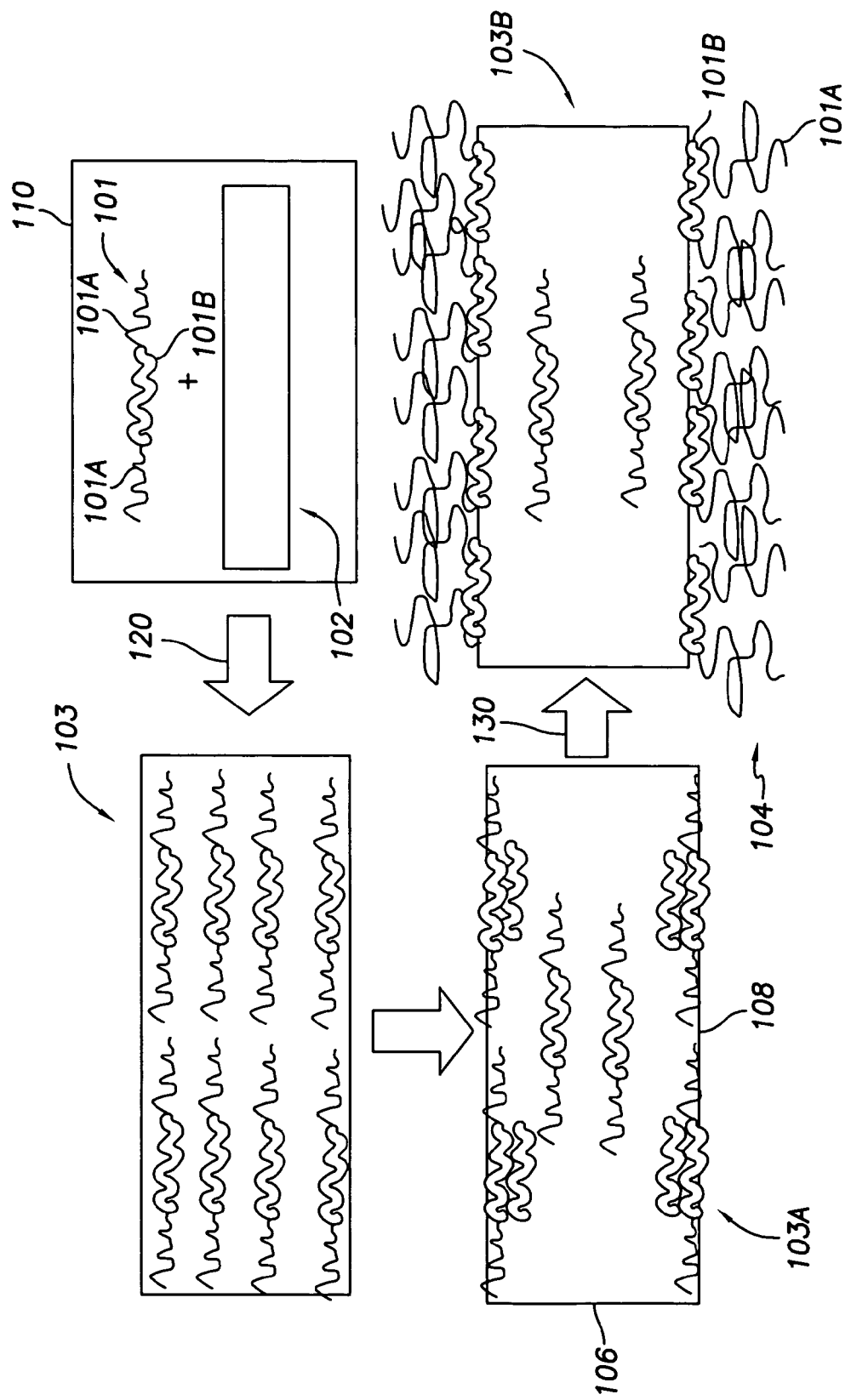
FIG. 1 is a flowchart schematic illustrating a surface modification amphiphilic copolymer (SMAC) blended into a base polymer and forming a lubricious surface coating in accordance with a method disclosed herein.

FIG. 1 shows a surface modification amphiphilic copolymer (SMAC) 101 blended into a base polymer 102 and forming a lubricious coating 104 in accordance with a method disclosed herein. In a blending step 110, SMAC 101 is blended as an additive with a base polymer 102, producing a blended polymeric material. For example, the weight percent of SMAC 101 in the blended polymeric material based on weight of base polymer may be in a range of about 0.2 percent to about 40 percent. In one embodiment, the weight percent of SMAC 101 is about five percent. In any case, the amount of SMAC 101 added to base polymer 102 should be measured so as to achieve a desired wet lubricity and its benefits such as reduction in protein adsorption, bacteria and cell adhesion, and thrombosis formation.

As noted above, SMAC 101 includes at least one hydrophilic segment 101A and at least one hydrophobic segment 101B. The schematic of SMAC 101 in FIG. 1 includes two hydrophilic segments 101A and one hydrophobic segment 101B in the form of an ABA triblock copolymer, but it should be understood that other forms of SMAC 101 are possible, including random block copolymers. For example, SMAC 101 may be a block copolymer in the form of $A(BA)_n$, $(AB)_n$, or $B(AB)_n$, wherein A is hydrophilic segment 101A and B is hydrophobic segment 101B and n is an integer greater than zero. For SMAC 101 in the form of ABA and BAB, the $M_w$ of the SMAC 101 may be in the range of about 400 to about 30,000. In one embodiment, the $M_w$ for the SMAC 101 is in the range of 1,000 to 10,000. Moreover, SMAC 101 may be a random block copolymer, represented generally as a copolymer in the form of "ABBAABABA," wherein the A and B segments may contain many monomer repeat units rather just one monomer repeat unit. It should be understood that other random forms for a random multi-block copolymer are within the scope of the present invention, and "ABBAABABA" as used herein represents any random multi-block copolymer. Moreover, each A segment and each B segment of SMAC 101 need not be identical in kind or segment chain length to any other A segment or B segment, respectively.

In a forming step 120, at least a part 103 of a medical device is formed with the blended polymeric material. As schematically shown by device part 103A, SMAC 101 spontaneously migrates from bulk 106 to surface 108 of device part 103 formed of the blended polymeric material since SMAC 101 is surface active. Step 130 includes implanting the medical device having device part 103 in a patient and allowing SMAC 101 to form lubricious coating 104 on device part 103, which is schematically shown in FIG. 1 as device part 103B. Hydrophilic segments 101A extend into biological media once contacting with blood and provide device part 103 with wet lubricity. Where base polymer 102 is hydrophobic, hydrophobic segment 101B interacts with hydrophobic base polymer 102 to help anchor SMAC 101 to surface 108. Although covalent bonds between base polymer 102 and SMAC 101 are not present, other chemical and physical interactions help entangle hydrophobic segment 101B with base polymer 102 so as to anchor SMAC 101 to surface 108, especially when segment 101B and polymer 102 are selected so as to have similar chemical groups, structures and/or properties. Device part 103 formed of the blended polymeric material may include any medical part, such as, for example, an intra-aortic balloon or a casing at least partially enclosing the medical device. For example, the medical device may be an implantable lead and device part 103 may include lead insulation tubing. In such a case, a lead insulation material may be used as base polymer 102. Lead insulation materials include, for example, silicone rubber, silicone polyurethane copolymer (SPC), and polyurethane, such as Pellethane 2363 55D.

In one embodiment of a method disclosed herein, blending step 110 includes melting together SMAC 101 and base polymer 102 in an extruder to produce the blended polymeric material. For example, after base polymer 102 is synthesized, a twin-screw extruder may be used to blend SMAC 101 with base polymer 102. The blended polymeric material may then be pelletized and sent for further processing for forming into device part 103 or may be extruded directly so as to form device part 103.

Alternatively, blending step 110 includes adding SMAC 101 into base polymer 102 during the synthesis of base polymer 102, in which case a twin-screw extruder is not required to mix SMAC 101 and base polymer 102 together. For example, SMAC 101 can be added into a reactant during the synthesis of base polymer. In this case, the synthesized base polymer 102 contains SMAC 101, and a twin-screw extruder is not required to mix SMAC 101 and base polymer 102 together. In step 120, an extrusion method, for example, may be employed to construct device part 103 formed of the blended polymeric material.

An implantable medical device having device part 103 formed of the blended polymeric material will now be described. In one embodiment, the medical device includes a device body and a casing formed of the blended polymeric material which at least partially encloses the device body. The blended polymeric material may include base polymer 101 and any one or combination of the SMACS 101, including the PEO/SI block copolymers further described below. FIG. 2A illustrates an implantable medical device in the form of a body implantable lead 200. Lead 200 includes a device body 212 having a proximal end portion 216 and a distal end portion 214, which includes a tip electrode 227, a shocking electrode 228, and a sensing electrode 229. The proximal end portion 216 includes a bifurcated connector assembly 226 coupling the lead 200 to a pacemaker/defibrillator.

The lead body 212 includes a casing 222 formed of the blended polymeric material. In one embodiment, casing 222 forms an insulative tubing enclosing a coil conductor 240, as illustrated in FIG. 2B. In FIG. 2A, casing 222 extends substantially the entire length of lead body 212. As noted above, the blended polymeric material forming casing 222 includes an SMAC blended with a base polymer, and therefore a lubricious coating forms on the casing when lead 200 is implanted, which also decreases protein adsorption, bacteria and cell adhesion, and thrombosis formation. Where casing 222 forms an insulative tubing, the base polymer in the blended polymeric material can be a lead insulation material, such as, for example, silicone rubber, polyurethane or silicone polyurethane copolymer (SPC).

A specific SMAC 101 is presented herein that includes at least one PEO segment and at least one silicone (SI) segment wherein the weight average molecular weight ($M_w$) of this particular SMAC is in the range of about 400 to about 50,000. This PEO/SI block copolymer may be in the form of ABA, BAB, AB, for example, and may also be a random multi-block copolymer, represented generally as a copolymer in the form of ABBAABABA, as defined above. For this PEO/SI block copolymer, whether in the form of ABA, as illustrated in FIG. 1, or BAB or AB, and so on, each hydrophilic segment 101A is PEO and hydrophobic segment 101B is SI. For the PEO/SI block copolymer in the form of ABA and BAB, the $M_w$ of the block copolymer may be in the range of about 400 to about 30,000. In one embodiment, the $M_w$ of the PEO/SI block copolymer is in the range of 1,000 to 10,000. In one embodiment where the PEO/SI block copolymer is a random multi-block copolymer described above, the $M_w$ of the PEO/SI block copolymer may be in the range of about 5000 to about 50,000. In one embodiment, the $M_w$ of each block A of PEO is in the range of about 150 to about 15,000, and in another embodiment the $M_w$ of each block B of SI is in the range of about 200 to about 15,000, whether the PEO/SI block copolymer is the form of ABA, BAB, AB or a random block copolymer. The chain lengths of each block A may be the same or different if the PEO/SI block copolymer contains more than one block A. The chain lengths of each block B may be the same or different if the PEO/SI block copolymer contains more than one block B.

In one embodiment, the PEO/SI block copolymer in the form of ABA may contain one SI segment or multiple SI segments connected together by DI. When n di-reactive group terminated silicone (diSI) molecules are used during synthesis, which will be further described below, and n being an integer greater than zero, the block B includes n SI segments connected by diisocyanate (DI) as a coupling agent, such that the PEO/SI block copolymer is represented by the formula PEO-DI-(SI-DI)$_n$-PEO. The DI may include, for example, methylene bis-(4-phenyl isocyanate) (MDI), hexamethylene diisocyanate (HMDI), methylene bis (p-cyclohexyl isocyanate) ($H_{12}$MDI), 3,3-bitoluene diisocyanate (TODI), cyclohexyl diisocyanate (CHDI), or toluene diisocyanate (TDI). Exemplary methods for making the PEO/SI block copolymer of various forms will now be described. For synthesis of PEO-DI-(SI-DI)$_n$-PEO, a two-stage method may be employed. Firstly, n+1 DI is reacted with n diSI to obtain an isocyanate-terminated prepolymer. Secondly, two moles of monomethoxy polyethylene oxide (mPEO) are reacted with one mole of the isocyanate-terminated prepolymer. The mPEO is terminated by a reactive group such as a hydroxyl or amine group on one end of the PEO molecule. The diSI is terminated on each end by a reactive group such as a hydroxyl or amine group.

A similar synthesis two-stage method may be used for making the PEO/SI block copolymer in the form BAB represented by the formula SI-DI-(PEO-DI)$_n$-SI, wherein n is an integer greater than zero. Accordingly, the block A may be one PEO segment or multiple PEO segments connected together by DI. Using the two-stage method described above, SI-DI-(PEO-DI)$_n$-SI is formed by firstly reacting n+1 DI with n di-reactive PEO (diPEO) to obtain an isocyanate-terminated prepolymer, and secondly reacting two moles of monomethoxy-silicone (moSI) with one mole of the isocyanate-terminated prepolymer. The diPEO is terminated on each end by a reactive group such as a hydroxyl or amine group. The moSI is terminated by a reactive group such as a hydroxyl or amine group on one end of the moSI molecule. For mPEO, moSI, diPEO, and diSI, it should be understood that other reactive groups can also be used to react with isocyanates to prepare the PEO/SI block copolymers.

The exemplary two-stage method discussed above may also be used for making the PEO/SI block copolymer in the form AB represented by the formula PEO-DI-SI. In this case, one mole of DI is reacted with one mole of moSI to obtain a monoisocyanate-terminated prepolymer, and one mole of mPEO is reacted with one mole of the monoisocyanate-terminated prepolymer.

For synthesis of a random multi-block copolymer represented by the formula PEO-DI-SI-DI-SI-DI-PEO-DI-PEO-DI-SI-DI-PEO-DI-SI-DI-PEO, the exemplary two-stage method includes (1) reacting n+1 DI with m diSi and n-m diPEO to obtain a multi-block isocyanate-terminated prepolymer, wherein n and m are integers greater than zero, and (2) reacting two moles of mPEO with one mole of the isocyanate-terminated prepolymer.

SMACs are particularly advantageous when hydrophobic block B of SMAC 101 has a chemical structure similar to base polymer 102, such as where the PEO/SI block copolymer is PEO-silicone-PEO and base polymer 102 is silicone rubber or a silicone polyurethane copolymer, for example. With reference to the schematic of FIG. 1, strong interactions between a silicone matrix of base polymer 102 and silicone block 101B of the PEO/SI block copolymer help to anchor lubricious coating 104 to surface 108.

The PEO/SI block copolymers described herein are SMACs which may be employed in the methods outlined above for providing a lubricious coating on a medical device. For example, the PEO/SI block copolymer may be blended with the base polymer as an additive, either by adding to a reactant during synthesis of base polymer 102 or by melting together the PEO/SI block copolymer in an extruder, to produce the blended polymeric material used to form device part 103 of a medical device, such as casing 222 in FIGS. 2A and 2B described above. The PEO/SI block copolymers can be also used for other applications, both in and out of the medical field. Moreover, other methods can be employed using the PEO/SI block copolymers to prepare lubricious coatings of substrates, such as for example solution casting, dip-coating and adsorption techniques further described below.

An example solution-casting method to obtain device part 103 formed of the blended polymeric material via solution-casting may include the steps of mixing the PEO/SI block copolymers with base polymer 102 in solution to produce a solution mixture, casting the solution mixture, and evaporating the solvent. For example, dimethyl formamide (DMF) or other solvent may be used as a cosolvent for the PEO/SI block copolymer and the base polymer. The base polymer may be dissolved in DMF at a concentration in a range of 2-25%, such as 5%. The SMAC may be dissolved in the polymer solution at a concentration in a range between 0.2% and 40% by weight of base polymer content. Alternatively, solutions of the PEO/SI block copolymers and the base polymer may be prepared separately and then mixed. To prepare a film of the blended polymeric material, for example, the mixed polymer solution is cast onto clean casting dishes and the cast films are dried in a ventilation oven at 60 degrees for 24 hours and then in a vacuum oven at 60 degrees for 24 hours to remove the solvent. A crosslinking agent may be added to the solution mixture to permanently prevent the PEO/SI block copolymer from escaping surface 108 of device part 103. By "permanently prevent" is meant that the crosslinking substantially entraps the PEO/SI block copolymer in base polymer 102 so that little or no the PEO/SI block copolymer leaches out into contacting bodily fluids. An example procedure for crosslinking is described in *Platelet adhesion onto segmented polyurethane film surfaces modified by addition and crosslinking of PEO-containing block copolymers*, J. H. Lee, et al., Biomaterials 21:683-691 (2000), incorporated herein by reference in its entirety.

In one embodiment, an implantable medical device such as lead 200 described above with reference to FIGS. 2A and 2B may include a device body 212 at least partially formed of a polymeric material including a base polymer and any one or combination of the PEO/SI block copolymers, described above. One or more PEO/SI block copolymers can also be used in conjunction with one or more other SMACs 101.

Figure 3:
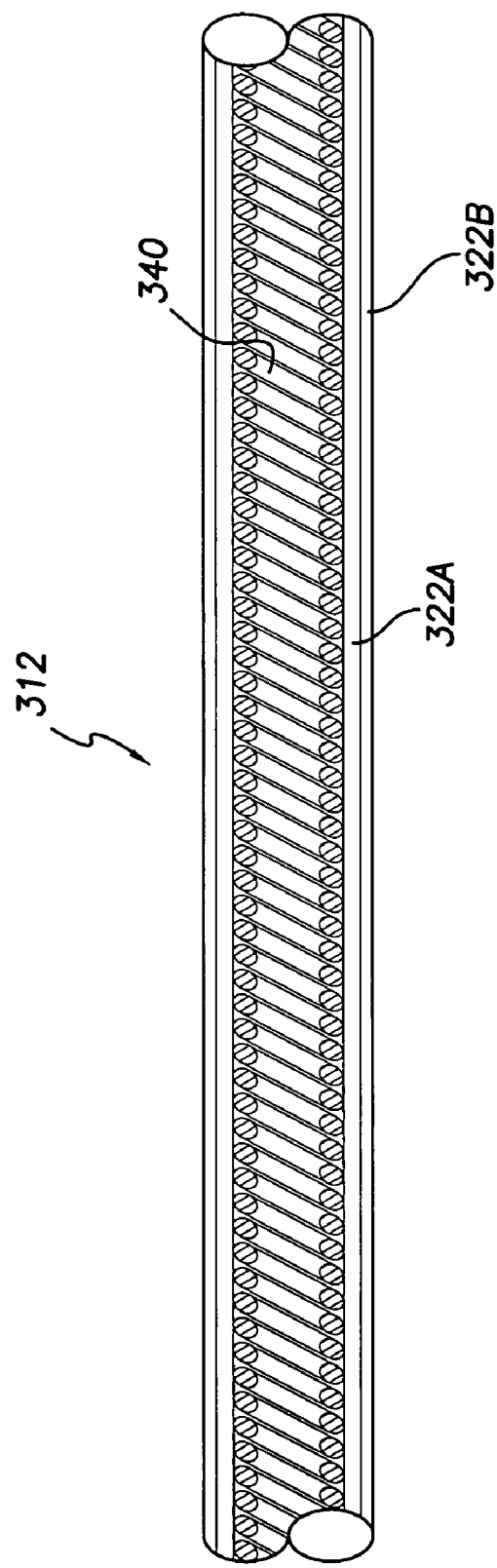
FIG. 3 is an axial cross section of a portion of the lead of FIG. 2A having a lead body formed of an inner base polymer layer and an outer SMAC layer in accordance with another embodiment.

In one embodiment, the implantable medical device is a lead, the base polymer is a lead insulation material, such as silicone or silicone polyurethane copolymer, and the device part formed of the polymeric material is lead insulation tubing, such as casing 222 in FIGS. 2A and 2B or a later-described device body 312 illustrated in FIG. 3. The PEO/SI block copolymers (and other SMAC 101, if used) forms lubricous coating on lead insulation tubing 222 or 312 when lead 200 is implanted. In another embodiment, illustrated in FIG. 3 as an axial cross-section of a portion of the lead of FIG. 2A, the polymeric material at least partially forms a device body 312 which includes an inner layer 322a formed of the base polymer coated by an outer layer 322b formed of the PEO/SI block copolymer. In FIG. 3, device body 312 including layers 322a and 322b coaxially surrounds a coil conductor 340.

In one embodiment, outer layer 322b may be deposited on inner layer 322a using a coating method, such as dip-coating or adsorption methods, or other methods of forming outer layer 322b and affixing to inner layer 322a. For example, to obtain outer layer 322b deposited on inner layer 322a by dip-coating, inner layer 322a is immersed in a solution mixture of the PEO/SI block copolymers and a solvent, which may be water or an organic chemical, and the solvent is evaporated. An adsorption method may include immersing inner layer 322a into an aqueous solution of the PEO/SI block copolymers and allowing the PEO/SI block copolymers to be adsorbed on the surface of inner layer 322a so as to form outer layer 322b. Adsorption occurs through the strong hydrophobic interactions between the SI segment of the PEO/SI block copolymers of outer layer 322b and a hydrophobic matrix included in the base polymer of inner layer 322a. Where the base polymer of inner layer 322a comprises silicone or a silicone polyurethane copolymer (SPC), the SI segment in the PEO/SI block copolymers strongly interacts with the silicone base polymer or a silicone segment of the silicone polyurethane copolymer due to their similar chemical structures. These strong interactions anchor the PEO/SI block copolymers of outer layer 322b to base polymer of inner layer 322a.

Example embodiments of the methods, systems, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An implantable medical device, comprising a device body at least partially formed of a polymeric material including a base polymer and a block copolymer, wherein the block copolymer is in the form of ABA, BAB, AB, or a random multi-block copolymer represented generally in the form of ABBAABABA, wherein the block A is PEO and the block B is silicone having at least one polyethylene oxide segment (PEO) and at least one silicone segment, wherein the weight average molecular weight of the block copolymer is in the range of about 400 to about 50,000, and wherein the base polymer material is one of a silicone rubber or a silicone polyurethane copolymer, and wherein covalent bonds are absent between the base polymer and the block copolymer is the form of ABA, BAB, AB, or a multi-block copolymer represented generally in the form of ABBAABABA, wherein the block A is PEO and the block B is silicone.

2. The implantable medical device of claim 1, wherein the block copolymer is blended as an additive into the base polymer.

3. The implantable medical device of claim 1, wherein the polymeric material is an inner layer coated by an outer layer, the inner layer being formed of the base polymer and the outer layer being formed of the block copolymer.

4. An implantable medical device, comprising a device body at least partially formed of a polymeric material including a base polymer and a block copolymer, wherein the block copolymer is in the form of ABA, BAB, AB, or a random multi-block copolymer represented generally in the form of ABBAABABA, wherein the block A is PEO and the block B is silicone having at least one polyethylene oxide segment (PEO) and at least one silicone segment, wherein the weight average molecular weight of the block copolymer is in the range of about 400 to about 50,000, and wherein the implantable medical device is a lead, the base polymer is a lead insulation material being one of silicone or silicone polyurethane copolymer, and the block copolymer is in the form of ABA, BAB, AB, or a multi-block copolymer represented generally in the form of ABBAABABA, wherein each A block is PEO and each B block is silicone, and wherein the device body at least partially formed of the polymeric material includes a lead insulation tubing at least partially formed of the polymeric material.

5. The implantable medical device of claim 4, wherein the block copolymer is configured to form a lubricious coating on the lead insulation tubing when the lead is implanted.

6. The implantable medical device of claim 5, wherein the lubricious coating is configured to decrease protein adsorption, bacteria and cell adhesion, and thrombosis formation.

7. The implantable medical device of claim 4, wherein the block copolymer is blended as an additive into the base polymer.

8. The implantable medical device of claim 4, wherein the polymeric material is an inner layer coated by an outer layer, the inner layer being formed of the base polymer and the outer layer being formed of the block copolymer.

9. The implantable medical device of claim 4, wherein the base polymer is a lead insulation material being one of silicone or silicone polyurethane copolymer.

10. An implantable medical device, comprising a device body at least partially formed of a polymeric material including a base polymer and a block copolymer, wherein the block copolymer is in the form of BAB or AB, wherein the block A is PEO and the block B is silicone, wherein the weight average molecular weight of the block copolymer is in the range of about 400 to about 50,000, and wherein the base polymer is one of a silicone rubber or a silicone polyurethane copolymer.

11. The implantable medical device of claim 10, wherein the block copolymer is blended as an additive into the base polymer.

12. An implantable medical device, comprising a device body at least partially formed of a polymeric material including a base polymer and a block copolymer, wherein the block copolymer is in the form of ABA, BAB, AB, or a random multi-block copolymer represented generally in the form of ABBAABABA, wherein the block A is PEO and the block B is silicone, wherein the weight average molecular weight of the block copolymer is in the range of about 400 to about 50,000, and wherein the base polymer is one of a silicone rubber or a silicone polyurethane copolymer, and wherein the polymeric material is an inner layer coated by an outer layer, the inner layer being formed of the base polymer and the outer layer being formed of the block copolymer.

* * * * *